Patented Sept. 20, 1949

2,482,202

UNITED STATES PATENT OFFICE 2,482,202

FREEZING COMESTIBLES WITH COMPATIBLE SOLUTIONS

Harry A. Noyes, Watertown, Mass.

No Drawing. Application April 10, 1943, Serial No. 482,611

7 Claims. (Cl. 99—193)

This invention relates to a specific part of the art of refrigerating foodstuffs and other substances, namely, the carrying out of the freezing step. It is more particularly concerned with the freezing of vegetable products resulting from the germination of blossoms, which are more or less pulpy in construction and contain substantial quantities of juice. Within this category are included, not only the products commonly known as fruits, but also edible seeds, in their pods or after shelling, kernels, etc. (such as peas, beans, string beans, green corn, etc.) prior to ripening or drying out. All such foodstuffs are included within the generic meaning of the term "fruits" as used in this application. It is not limited to such products, however, but is applicable also to various other foods of which the natural juices or their fresh and juicy characteristics are desired qualities. Its object, generally speaking, is to furnish an improved procedure of freezing such products, to the end that the frozen articles immediately after the freezing thereof will be more nearly like the products of nature in their optimum stages of ripeness and freshness, and will retain to the fullest possible measure the natural characteristics of the raw products as the same existed when those products were subjected to the freezing operation. This subject is related to that of my Patent No. 2,286,225, granted June 16, 1943, and constitutes improvements over the method therein disclosed.

The present application is also related to my prior application entitled "Freezing comestibles with compatible solutions," filed November 17, 1939, Serial No. 304,954 which is now abandoned, and is a continuation-in-part thereof.

The general principles of the present invention, briefly stated, comprise the operation of freezing food articles while supported in free space by causing a refrigerant solution to flow over them at a temperature low enough to cause quick freezing to take place, at a rate such that the refrigerant contacting the surfaces of the articles is quickly dislodged and replaced by oncoming refrigerant, using as the refrigerant an aqueous solution of soluble matter which is compatible with the flavors and other qualities of the foodstuff being frozen insofar as the refrigerant affects the foodstuff during the freezing thereof, maintaining the refrigerant solution of a composition such that it is freely fluid at temperatures low enough to effect quick freezing, and, particularly, maintaining the temperature of the solution so near its freezing point that ice is the stable form of water to exist at the surfaces of the comestibles when the refrigerant on such surfaces is diluted by water or juice exuding in appreciable amount from the surfaces in consequence of both osmotic actions and the temperature differential existing between the whole or part of the foodstuff and the contacting freezing solution. Employment of refrigerant solutions that separate ice first on continued heat extraction, and the control of temperature and viscosity are features of this invention that are of the utmost importance. They constitute the main departures from the disclosure of my prior Patent No. 2,286,225, and from all other prior disclosures of which I have knowledge, and they accomplish the desired end by preventing in the highest possible measure depletion of the comestibles while carrying out the freezing thereof.

Osmostic action is the major cause of depletion of juice-containing comestibles and the deterioration of the composition and flavors of such comestibles when they are subjected to the action of direct contact freezing solutions. Water is the principal constituent of comestible juices, and its concentration percentage is much greater in the comestible than in aqueous refrigerant solutions in which substances have been dissolved for lowering the freezing point of water. The greater concentration of dissolved matter in the refrigerant leads to osmotic action, causing water, with dissolved extractives, to move out from the comestibles, while more or less of the substances dissolved in the refrigerant, the concentration of which in the refrigerant is greater than in the comestible, pass into the comestible in conformity with the laws of the solutions applicable to the existing conditions. Hence prolonged contact of refrigerant solution with comestibles of which the juices at their surfaces, as well as in their interiors, are in the liquid state, results in substantial losses of juice and shrinkage of the comestible bodies.

Substances which may be dissolved in water to produce refrigerant solutions of suitably low freezing points and otherwise desirable or unobjectionable properties are salt (sodium chloride), sugars, and mixtures containing these substances. Sugar solutions are more satisfactory for use with those fruits which normally contain substantial quantities of sugar, and those which are commonly eaten with added sugar. However, sodium chloride is a constituent of many foods and the amount of salt remaining as part of the actual foodstuff (not the covering film) after freezing with sodium chloride solutions of less than eutectic strength, in accordance with the principles of this invention, is unobjectionable with many foodstuffs. The sugar solutions which I use are usually principally water with sucrose and the hexose sugars named dextrose and levulose, as these are the most readily available useful sugars; although I am not limited as to specific sugars used except by the factors of solubilities in water and viscosities in relation to operative temperatures. Sucrose is ordinary cane or beet sugar and invert sugar is a mixture of dextrose and levulose in approximately equal amounts. Dextrose is glucose (it is "cerelose" in certain commercial forms) and levulose is known as fructose. Both are obtained from more sources than the inversion of sucrose.

Aqueous solutions of fully inverted sucrose have freezing points below the freezing point of water dependent on the quantities and proportions of the hexose sugars present in accordance with the laws governing solutions. The freezing point of a solution is here defined as the temperature at which some of the water in the solution first forms ice. It is dependent on the sum total of all the sugars and other substances that are in water solution as, in general, the sum of the molecules in solution in water in relation to the amount of water present sets the temperature, lower than 32° F., at which the formation of ice can take place. Separation of dextrose from an invert sugar solution by lowering the temperature is due to the decreased solubility of dextrose in water at the lower temperature. It is not the freezing of the solution. Mixtures in various proportions of the sugars mentioned, as well as other sugars, may be employed in order to make solutions having suitable freezing points and operative viscosities. Dextrose with some dextrins and maltose, as well as sucrose and/or levulose, and honey are examples of such mixtures.

An important factor of the invention is that the freezing solution must be free-flowing and be applied in the form of a spray or shower delivered from above, or both from above and from the sides, to comestible bodies, so supported that applied liquid can drain freely from them, at a rate and in volume greater than necessary to cover the surfaces of such bodies with a film of the refrigerated liquid and sufficient to cause rapid flow thereover and rapid replacement or washing off of liquid by newly delivered liquid. The necessary rate of displacement is high enough to cause substitution of fresh liquid before the temperature of the liquid at the surfaces of the bodies has been raised more than two degrees Fahrenheit. At all times during the freezing of the articles the rate of application and the force of gravity increase the "wiping action" of the freezing solution on the surface of the comestibles. The spraying cannot be said to actually change straight line flow to "turbulent" flow, although liquid particles arriving here and there on the moving liquid present on the foodstuff surfaces cause both increased "wiping" and increased motion in the freezing solution. The specific gravity of the refrigerant solution is enough higher than the specific gravity of water and the comestible juices to increase contacts with the actual foodstuff surfaces in such ways that a quicker formation of a solid layer of foodstuff at the surface layer thereof may occur. I do not apply the spray with driving force such that it will break through the moving layer of liquid on the comestible surfaces as such force could delay the first incipient freezing or break down the surface structure of the foodstuff. Both absolutely even distribution of the refrigerant solution over the surface supporting the foodstuff and absolutely even distribution of the foodstuff on that surface at all times are unattainable in commercial practice. These are additional reasons for applying the refrigerant at a rate greater than the minimum necessary for carrying away heat, as the increased rate compensates for uneven contacts and distribution from the distributing equipment.

I have found that solutions having a viscosity of 65 centipoises or more are too thick and sluggish to produce my required frozen product, and I find it preferable, and wholly satisfactory, to use solutions within the viscosity range of about 30 centipoises to about 60 centipoises at the temperature of use. Colloidal materials from the comestibles (such as pectins, for example) increase the viscosity of the freezing solution and such increases in viscosity have to be considered as part of the 65 centipoises. I have found that a sugar concentration of about 50% is the maximum which will give a solution in these circumstances having low enough viscosity, and also that sugar concentrations of as low as 38% have developed sufficiently low freezing points, when the sugars present in the solution are all hexose sugars, or other sugars having an average arithmetical molecular weight near to that of the general hexose sugar formula of $C_6H_{12}O_6$, as measured by the effect of their presence on the lowering of the freezing point of water solutions. Each solution has its own working temperature, and all those which are suitable for the performance of this invention come within a working temperature range between a low of approximately 10° F. (necessary for some comestibles having relatively high concentrations of soluble solids) and a high of around 20° F. (useable on some types of strawberries and other comestibles having comparatively low contents of soluble solids). A refrigerant solution selected for use at 18° F. would have a freezing point somewhere between just under 18° F. and near 16° F. A solution used at 12° F. would have several properties that would be satisfactory at 18° F., but it would not be used at 18° F. because of its freezing point being lower than approximately 16° F.

To illustrate my investigations and discoveries of the changing properties of sugar solutions with changing temperature I have prepared the following tables. The first table gives figures on just two sucrose solutions, namely, a 40% and a 50% sugar concentration. The second table gives data on four invert sugar solutions, namely 40%, 45%, 50% and 55% sugar concentration. The data of these tables has not been found anywhere in the literature for the range of temperature covered.

SUCROSE SOLUTIONS

Absolute viscosity in centipoises at different temperatures

| Temp., degrees F. | Absolute viscosity in centipoises (approx.) | | | Increase in viscosity | | | |
|---|---|---|---|---|---|---|---|
| | 40% | 50% | 50% over 40% | Over 70 degrees F. | | For last 10 degrees lowering of temp. | |
| | | | | 40% | 50% | 40% | 50% |
| 70 | 6 | 14 | 8 | | | | |
| 65 | 7 | 17 | 10 | 1 | 3 | | |
| 60 | 8- | 19 | 11+ | 2- | 5 | | |
| 55 | 8+ | 22 | 14- | 2+ | 8 | 2- | 5 |
| 50 | 9 | 26 | 17 | 3 | 12 | 1 | 5 |
| 45 | 10 | 29 | 19 | 4 | 15 | 1+ | 6- |
| 40 | 11 | 33 | 22 | 5 | 19 | 2- | 5+ |
| 35 | 12+ | 38 | 26- | 6+ | 24 | 2 | 5 |
| 30 | 14 | 44 | 30 | 8 | 30 | 2+ | 9 |
| 25 | 17 | 50 | 33 | 11 | 36 | 3 | 11 |
| 20 | (¹) | 58 | | | 44 | 5- | 12 |
| 15 | (¹) | | | | | | 14 |

¹ Frozen.

INVERT SUGAR SOLUTIONS
*Absolute viscosity in centipoises at different temperatures*

| Temp. in °F. | Absolute viscosity in centipoises (approx.) | | | | Increase in Viscosity | | | | | | | | | | |
|---|---|---|---|---|---|---|---|---|---|---|---|---|---|---|---|
| | | | | | 45% over 40% | 50% over 40% | 55% over 45% | over 70 degrees | | | | For last 10 degrees lowering of temp. | | | |
| | 40% | 45% | 50% | 55% | | | | 40% | 45% | 50% | 55% | 40% | 45% | 50% | 55% |
| 70 | 4 | 7 | 11+ | 20 | 3 | 7+ | 13 | | | | | | | | |
| 65 | 5 | 8 | 13 | 23 | 3 | 8 | 15 | 1 | 1 | 1+ | 3 | | | | |
| 60 | 6 | 9+ | 14+ | 27 | 3+ | 8+ | 18- | 2 | 2+ | 3 | 7 | 2 | 2+ | 3 | 7 |
| 55 | 7 | 11 | 17 | 32 | 4 | 10 | 21 | 3 | 4 | 6- | 12 | 2 | 3 | 4 | 9 |
| 50 | 8 | 13- | 19 | 38 | 4+ | 11 | 25+ | 4 | 6- | 8- | 18 | 2 | 3 | 5- | 11 |
| 45 | 9- | 14 | 22+ | 45 | 5+ | 13+ | 31 | 5- | 7 | 11 | 25 | 2- | 3 | 5+ | 13 |
| 40 | 10- | 16 | 26 | 55 | 6+ | 16+ | 39 | 6- | 9 | 15- | 35 | 2- | 3+ | 7 | 17 |
| 35 | 11+ | 18 | 30+ | 66 | 7- | 19 | 48 | 7+ | 11 | 19 | 46 | 3- | 4 | 8 | 21 |
| 30 | 13- | 21 | 37 | 80 | 8+ | 24+ | 59 | 9- | 14 | 26- | 60 | 3 | 5 | 11 | 25 |
| 25 | 14 | 25 | 44 | 98 | 11 | 30 | 73 | 10 | 18 | 33- | 78 | 3- | 7 | 14- | 32 |
| 20 | 22 | 29 | 52 | 128 | 7 | 30 | 99 | 18 | 22 | 41- | 108 | 3- | 8 | 15 | 48 |
| 15 | (¹) | 35 | 64 | (²) | | | | | 28 | 53- | | | 10 | 20 | |
| 10 | (¹) | (¹) | 77 | (²) | | | | | | 66- | | | | 25 | |
| 5 | (¹) | (¹) | (¹) | (²) | | | | | | | | | | | |

¹ Frozen.
² Too viscous for determination by equipment used on this work.

The solutions that I use are not those which have the lowest freezing points possible of attainment with some of the particular sugars employed or mixtures thereof. I do not limit myself to the use of a single sugar alone in my solutions and may use mixtures of different sugars to obtain solutions which will remain liquid at temperatures below that at which a low-solubility sugar, such as dextrose, would separate if it were the only sugar in the water solution.

The following table gives a number of the different sugar solutions that I have used as freezing agents in my process because they come inside the general limits. Not all were or could be used on the same comestible. Each concentration and each mixture is a different sugar solution from every other.

SOME SUGAR SOLUTIONS USED IN THIS INVENTION

| Total sugar content of solution, percent | Composition in percent of whole solution, as— | | | | | |
|---|---|---|---|---|---|---|
| | sucrose | dextrose | levulose | water | fruit juices sugar | Other Subst. |
| 50 | 4.0 | 20.0 | 24.0 | 49.0 | 2.0 | 1.0 |
| 50 | 2.0 | 20.0 | 24.0 | 49.0 | 4.0 | 1.0 |
| 50 | --- | 18.0 | 27.0 | 48.5 | 6.0 | 1.0 |
| 48.0 | 1.3 | 24.3 | 22.4 | 51.0 | --- | 1.0 |
| 48.0 | 6.3 | 21.7 | 20.0 | 51.0 | --- | 1.0 |
| 48.0 | 5.0 | 21.0 | 20.0 | 51.0 | 2.0 | 1.0 |
| 48.0 | 5.0 | 21.0 | 20.0 | 50.0 | 2.0 | 2.0 |
| 46.0 | 1.3 | 23.3 | 21.3 | 53.0 | --- | 1.0 |
| 46.0 | --- | 18.0 | 23.0 | 53.0 | 5.0 | 1.0 |
| 46.0 | 5.5 | 16.2 | 20.7 | 52.5 | 3.6 | 1.5 |
| 46.0 | 5.5 | 16.2 | 20.7 | 50.5 | 3.6 | 3.5 |
| 44.5 | --- | 23.0 | 21.2 | --- | .3 | .4 |
| 45.0 | 5.1 | 22.2 | 17.4 | 54.0 | .3 | 1.0 |
| 45.0 | 5.1 | 22.2 | 17.4 | 52.0 | .3 | 3.0 |
| 45.0 | --- | 23.0 | 22.0 | 54.5 | --- | .5 |
| 45.0 | 3.0 | 23.0 | 19.0 | 54.5 | --- | .5 |
| 45.0 | 3.0 | 20.0 | 20.5 | 54.0 | 1.5 | 1.0 |
| 45.0 | .5 | 20.0 | 18.5 | 54.0 | 6.0 | 1.0 |
| 45.0 | 2.0 | 22.0 | 15.0 | 54.0 | 6.0 | 1.0 |
| 42.0 | 3.0 | 21.0 | 18.0 | 57.0 | --- | 1.0 |
| 42.0 | --- | 21.5 | 16.0 | 56.0 | 4.5 | 2.0 |
| 42.0 | --- | 20.0 | 20.0 | 57.0 | 2.0 | 1.0 |
| 40.0 | 2.0 | 21.0 | 17.0 | 59.5 | --- | .5 |
| 40.0 | 1.5 | 18.0 | 14.1 | 59.5 | 6.4 | .5 |
| 40.0 | .8 | 18.3 | 15.2 | 58.5 | 5.8 | 1.5 |
| 40.0 | 7.0 | 17.1 | 11.2 | 59.0 | 4.7 | 1.0 |
| 39.0 | 6.0 | 17.1 | 11.2 | 58.5 | 4.7 | 2.5 |
| 38.0 | .9 | 18.9 | 18.0 | 61.2 | .2 | .8 |
| 38.0 | 1.0 | 23.0 | 13.5 | 61.0 | .5 | 1.0 |
| 38.0 | .5 | 22.0 | 12.5 | 60.9 | 3.0 | 1.1 |
| 38.0 | --- | 21.0 | 11.5 | 60.8 | 5.0 | 1.2 |
| 38.0 | --- | 24.4 | 11.6 | 61.3 | 2.0 | 0.7 |
| 38.0 | .5 | 23.3 | 9.5 | 61.0 | 4.7 | 1.0 |

Standard references give the heat of conductivity of water as .0013 and ice as .0057. These figures are in the direction that confirms my discoveries that it is feasible, in other than an immersion process, to freeze the surface of the foodstuff by a liquid solution of proper properties, before the interior of a sizable comestible has lowered its temperature to the freezing point. Solidification advances progressively inward with little movement of liquid constituents from cell to cell. In each cell are, moreover, colloidal materials and these under the rapid freezing technics of my process, may produce a jellation, firming and subsequent lowering of the temperature to below the freezing point, without extraction of the full quantity of heat theoretically necessary to solidify the water contained. My products have "natural" characteristics to a greater extent than those that are frozen when the temperature of such foodstuff as a large sized peach is lowered to the freezing point, is held there until the latent heat of freezing has been extracted and then lowered again towards the temperature of the freezing solution.

The factors on which my invention depends include the following: That freezing of comestibles in order to preserve their "natural" state is accomplished by distribution of the freezing solution as a spray over said comestibles under conditions which include: one, that the refrigerating solution must be free flowing (less than about 65 centipoises viscosity) enough at the temperatures applied so that it is replaced immediately by following solution with no loss of continuity whereby the solution exerts no appreciable osmotic action; two, that the refrigerated solution must be applied in great enough volume, per given surface in a given time, so that the temperature of the solution is not raised sufficiently to prevent the maintenance of the other conditions prescribed; three, the temperature of the solution must be low enough below the freezing point of the comestibles to cause the freezing action which is known as quick freezing; and, four, the temperature at which the solution is applied must be so near the freezing point of the solution that under the above conditions, it freezes the surfaces of the comestibles before there is appreciable extraction of their constituents from them. It is an objective to have the surfaces of the comestibles give up heat—to the full extent that the original or frozen surfaces can—at the temperature differentials employed. Fulfillment of the foregoing conditions causes ice to be formed at the surfaces of the comestible bodies upon contact with the solution, because the film of liquid on such surfaces is higher in water concentration (i. e. more dilute) than the refrigerant solution, therefore has a higher freezing point than the solution, and the foodstuff starts to freeze. The rapid replacement of the refrigerant on the comestibles by the freely falling spray, carries away heat faster than heat is delivered from the interior of the comestible body, wherefore the ice phase initially produced remains and forms an impervious shell preventing osmotic interchange. Thereafter the freezing action progresses until the comestibles are frozen throughout.

The actual amount of heat extraction necessary to freeze a given weight of a comestible is easily determined as are likewise the heat losses that occur in operating the freezing equipment, including, for example, leakage of refrigeration, condensation of water from the air to frost or ice and the pumping energy expended. A continuous operation becomes the extraction of a certain amount of heat in a given time under the conditions of freezing solution necessary to maintain the foodstuffs in their approximate natural state as described earlier in this disclosure. The load on the equipment may be practically constant in a continuous belt freezing spray tunnel operation or with a group of batch units loaded in rotation. In a single batch operation more refrigeration can be used at the start of the freezing of the batch, and proper operation of my process requires that the extra refrigeration be available and used there.

Since sugar can be crystallized (precipitated) from certain solutions because of the lower solubility of one sugar that may be present, since ice can be made to separate from my sugar solutions and since ice can be formed by too low temperatures of the primary refrigerant on the other side of the heat exchanger cooling the refrigerating solution in its cycling—after the solution runs back from the foodstuff by gravity—the designing of the equipment for my process is different than designing, for example, either for an "immersion" process or for a calcium chloride brine refrigerating solution. This is important because the zone of operation of my process is narrow and the properties of the solutions exist in a narrow range of temperature.

For a given sugar solution which has its own definite composition, the depression of the freezing point is directly related to the molecular weight of sugar in solution and its solubility at the temperature used. Accordingly the relative proportions of sugars of different molecular weights are important in determining the characteristics of a particular solution. The hexose sugars, dextrose and levulose, therefore, are more efficient for lowering the freezing point of water than equal weights of disaccharides, of which sucrose is the most commonly used. Dextrose and levulose are approximately interchangeable as far as their effects on lowering the freezing point of water are concerned, as long as they are soluble, but these sugars are not interchangeable as means of making freezing agents because dextrose is not soluble enough to make, by its use alone, a solution of which the freezing point is sufficiently low to produce my "ideal" products. Levulose, however, is so soluble that solutions made with it have too great viscosities when the levulose concentration is such as to give freezing points lower than approximately plus 10° F.

The cycle of my process is as follows—A solution falling within the range of required properties is cooled to the proper temperature for that solution by a cooling means: The foodstuff to be frozen is placed in an insulated chamber suitable for holding the foodstuff supported in the air on a means for holding it that is so constructed that it does not hold back liquid falling from above—through the air—to an appreciable extent: The solution that has been cooled is distributed as a spray (under my definition) from above the foodstuff and the solution contacts the surface of the foodstuff abstracting heat from the same as it falls to the bottom of the chamber, from whence it goes to be recooled for its next cycling.

The optimum conditions for the carrying out of my freezing invention take place in any specific freezing operation when that water which condenses from the air, about parts of the freezing apparatus, forms ice and does not dilute the freezing solution, which would, in effect, change that solution to another solution. Also under optimum conditions, any ice added to the cooled solution that is ready for circulation, through spraying over the foodstuff, would melt very slowly because the temperature of the solution would be virtually at its freezing point.

The optimum in a process, however, is not constantly present because this is a rapid heat extraction procedure in which the heat abstracted from the comestible adds to the heat in the solution and thereby tends to raise the temperature of the solution above the temperature at which added water could only exist as ice. In my process lower temperatures are sacrificed because solution conditions that go with the lower temperatures are more detrimental to producing my products than any gains that lower temperatures could produce. The large volume of freezing solution, that I apply, per unit of comestible surface in a unit of time, when coupled with the mobility of solution that I require, make for holding the temperature of the contacting freezing solution at the surface of the comestible where osmotic action of the solution on the foodstuff will be lessened below that which has been practice and knowledge of the art.

In order to explain further the characteristics of the invention, the following illustrative particular examples are given. In all of them the temperatures are above zero Fahrenheit.

*Example 1. Strawberries.*—In one procedure the berries, after being hulled, washed and drained, are placed in an insulated chamber on a freely draining, horizontally traveling belt in layers up to three deep and subjected to a spray of a solution consisting of approximately 23% dextrose, 22% levulose, 2% extractives from comestible sources, and the balance essentially water. The solution is applied to the berries at a temperature of 16° F. at a rate of three or more gallons per square foot of belt surface per minute. In some cases the rate may be from four to six gallons per square foot of belt surface per minute in the early stages of the procedure for a few minutes, and subsequently decreased (to from 15% to 25% of the original rate, for example). In 15 minutes, more or less, the berries are solidified to the desired extent. They come out of the freezing chamber coated with solution and they are found to be cellularly, cytologically, and as individual units virtually unchanged in chemical composition and to have their structure and natural characteristics preserved as they exist inside the surrounding solution film.

An alternative procedure is to employ a high levulose solution (i. e. one containing levulose and dextrose in which the content of levulose is substantially greater than that of dextrose) having a freezing point of approximately 10° F. and maintain it at a temperature close to its freezing point. The procedure is otherwise like that first described except that the time in the freezing chamber is shorter.

A further alternative is to employ a high levulose solution diluted sufficiently to make its freezing point about 14° F. and apply it to the berries at a temperature of not over 16° F., in substantially the same way as the original example.

Still another alternative is to make a solution having a viscosity less than 40 centipoises and a freezing temperature of approximately 17° F. and apply it in copious volume at a temperature of approximately 18° F. Various ones of the sugar solutions recited in the tables precedently given may be used.

*Example 2. Cherries.*—Prior to freezing, cherries are customarily pitted. This is done in commercial practice by pushing out the pit by a fork which is passed through the pulp of the cherry while held in a perforated pocket. The pitted cherries are wet and exude juices as received at the freezer. This fruit has a tendency to super-cool before freezing. I may use different freezing solutions in accordance with this invention, but all must have viscosity at the temperature of application, of not over approximately 65 centipoises and freezing points in the range of 10° to 13° F. The cherries are loaded on the carrier belt from one to three deep, and the solutions are applied at temperatures within one or two degrees of their freezing points and in volumes up to, preferably, five gallons per square foot of supporting belt surface per minute at the start, which may be reduced after a few minutes. Preferably I agitate the cherries slightly after their surfaces have been reduced to the freezing temperature so as to upset any super-cooling that may take place and allow the freezing to continue regularly. Cherries can be frozen in about 20 minutes in this manner.

*Example 3. Raspberries.*—The procedure is varied for raspberries because of their cup shape (making them capable of retaining masses of more viscous solutions in their hollow cavities) and the delicacy of their structure. Solutions of viscosity in the neighborhood of 50 centipoises and freezing points of 12° F. or slightly lower, are preferably employed and are applied to the fruit at temperatures between 12° and 14° F. The fruit is distributed on the supporting belt about two berries deep, subject to the inevitable variations, and the volume of solution is preferably in excess of three gallons per minute per square foot of belt surface at the commencement, and may be later diminished. Fifteen minutes is usually sufficient to freeze the berries fully in this procedure.

*Example 4. Peaches.*—For freezing whole peaches a solution having a freezing point in the range of 10° to 12° F. is preferably used and is applied at temperatures in the range of from 12° to 14° F. With unpeeled whole peaches the solution need not be held as close to its freezing point as with strawberries and with cut or sliced peaches. They can be loaded in deeper layers than berries on the carrying belt and held for a longer time in the freezing chamber. Those of average size (about two inches in diameter) can be frozen within three quarters of an hour. In freezing peaches when sliced, or with the skin removed, the temperature of the solution is held near to its freezing point and only enough higher than the freezing point to prevent ice from forming in the solution itself.

*Example 5. Apples.*—This fruit is usually frozen after being peeled, cored and quartered or sliced. The pieces are loaded on the carrying belt to a depth up to two inches. I use sugar solutions of viscosities within the range previously defined at the temperatures used, and of which the freezing points are in the range from 10° to 16° F. The temperatures at which the solutions are applied are always near to (within two degrees of) their respective freezing points. Those having higher freezing points within the permissible range are preferable to use in cases where especially free flow is needed to preserve the natural characteristics of the fruit.

*Example 6. Pineapples.*—For freezing slices of ripe pineapples, I may use solutions having freezing points at one or another degree within the range from 10° to 16° F. approximately. Any such solution is applied at a temperature near its freezing point, and all have a viscosity of less than 65 centipoises at the temperature of use. They may contain pineapple juice with solutions of sugars suitable to obtain the prescribed freezing point with low viscosity.

*Example 7. Green Peas.*—Because of their comparatively uniform size and spherical shape, peas can be loaded on the supporting belt in the freezing chamber in substantially uniform layers by mechanical means. They may be loaded in the order of five or more pounds per square foot of belt surface. A large volume of freezing solution per square foot of belt surface per minute can be advantageously applied, on account of the large surface area per pound of peas; and I may use more than eight gallons per square foot per minute during the first three minutes the peas are in the freezing chamber. Several of the sugar solutions precedently named, having viscosity of less than 65 centipoises at 16° F. and having a freezing point of 15° F., can be applied at temperatures between 15° and 17° F. for freezing peas without sensible depletion. Also sugar solutions having freezing points around 12° F., and of which the viscosity is less than 65 centipoises at 13° F., are effectively useable within two degrees of their respective freezing points.

Many of the comestibles treated in accordance with the invention give off liquids which are taken up by the freezing solution. This is due in part to wash water adhering to their surfaces, in part to osmosis occurring before the sealing ice has formed at the surface and, in the case of cut fruits, is due in large measure to the juice pouring from the cells which have been opened by cutting. These accretions of juice add constituents of comestibles to the freezing solutions. Eventually they may dilute the solutions to the extent that the freezing points are too high. Then the solutions are adjusted to the proper condition by extraction of water or addition of more of the soluble solids.

In all embodiments and applications of this invention the freezing solutions have compositions such that even a slight dilution by water at the temperature of use at the surfaces of the comestible bodies causes ice to form at such surfaces. This is a very important feature of the invention. All of the solutions are of less than eutectic strength for their components, wherefore ice forms separately as the solid product on cooling; these solutions forming new solutions because of their different compositions from the original.

It is to be understood that the utility of the invention is not in any wise limited to the freezing of the specific fruits and one vegetable mentioned in the preceding examples. Neither is the invention limited to the freezing solutions and temperature depressants named in the preceding description and to none other. On the contrary, it is of general application as to comestibles treated and refrigerant solutions within the limitations of viscosity and temperature set forth in the preceding disclosure.

I claim:

1. The method of freezing fruits and vegetables, comprising directing a spray of a liquid refrigerant against bodies of such comestibles while supported in the atmosphere at a rate and in a volume such as to envelope such bodies and rapidly remove and renew the liquid in contact with the surfaces of the bodies, such refrigerant being an aqueous solution of matter compatible with the comestible having a freezing point below 20° F. and a viscosity of less than 65 centipoises at the temperature of use, and applying it at a temperature within two degrees above its freezing point.

2. The method of freezing fruits and vegetables, which consists in supporting a quantity of comestibles clear of any continuous body of liquid, causing a liquid refrigerant to flow over such comestibles in volume such as to envelop the comestibles and at a rate sufficient to renew the liquid in contact with the comestibles before its temperature at the interface has been raised more than two degrees by heat absorbed from the comestibles, the refrigerant being an aqueous solution containing a temperature depressant, having a viscosity of less than 65 centipoises at the temperature of application, and a freezing point in the range between 10° and 20° F., and causing the temperature of the solution as applied to be at all times within the temperature range of two degrees above its freezing point.

3. The method of freezing fruits and vegetables, comprising spraying over such comestibles in their natural state and while supported in the atmosphere a refrigerated sugar solution made principally from a glucose base of which the freezing point is within the range of 10° to 20° F. and the viscosity is under 65 centipoises at the temperature of operation, and maintaining the temperature of the solution when applied to the comestibles at a point within two degrees above the freezing point.

4. The method of freezing fruit, which consists in supporting a quantity of fruit bodies in a gaseous atmosphere and in a position such that liquid applied to their surfaces can readily drain away therefrom, causing an aqueous solution of sugar, of which the sugar concentration is between 50% and 38% and the freezing point is between 10° and 20° F., to pass in a flood over the surfaces of the fruit bodies at a rate such as to continuously displace the liquid in contact with such surfaces before the temperature of that liquid has been raised more than two degrees, and causing the temperature of the solution at the time of application to be at all times less than two degrees higher than the temperature at which ice will begin to form in the solution.

5. The method of freezing fruit, comprising supporting fruit bodies in a gaseous atmosphere and in a position such that liquid applied to their surfaces can freely drain away, providing a liquid refrigerant which consists mainly of an aqueous solution of sugars including dextrose and levulose in a concentration such that its freezing point is in the near enighborhood of 12° F. and of which the viscosity is between 30 and 60 centipoises at 13° F., spraying such solution on such fruit bodies in volume sufficient to cover their surfaces and at a rate sufficient to displace the solution while the rise of temperature thereof by heat received from the heat of the fruit is within two degrees F., and causing the temperature of the solution at the time of application to be continuously in the near neighborhood of 13° F.

6. The method of freezing fruit, comprising supporting fruit bodies in a position in the atmosphere such that liquid applied to their surfaces can freely drain away, providing a liquid refrigerant which consists mainly of an aqueous solution of sugars including dextrose, having a freezing point of approximately 16° F. and a viscosity of less than 45 centipoises at a temperature near the freezing point, and spraying such solution on the fruit bodies at a temperature less than two degrees above said freezing point in volume sufficient to cover their surfaces and at a rate sufficient to constantly and rapidly displace and renew the liquid cover.

7. The method of freezing fruits and vegetables which contain substantial quantities of water, which comprises directing a spray of liquid refrigerant over unfrozen comestible bodies while supported in the atmosphere at a rate and in a volume such as to produce a constantly moving and rapidly renewed thickness of the refrigerant solution at the surfaces of the bodies, the liquid being an aqueous solution of solid matter compatible with the comestible having a freezing point in the range between 10° and 20° F. and a viscosity of less than 65 centipoises at the temperature of use, maintaining the temperature of the flowing refrigerant less than two degrees higher than its freezing point until the surfaces of the comestible bodies have been frozen, and thereafter reducing the rate of flow of the refrigerant and continuing its flow at a rate sufficient to maintain substantially the initial temperatures at the surfaces of the comestible bodies until such bodies are frozen throughout.

HARRY A. NOYES.

REFERENCES CITED

The following references are of record in the file of this patent:

UNITED STATES PATENTS

| Number | Name | Date |
|---|---|---|
| 2,140,043 | Zarotschenzeff | Dec. 13, 1938 |
| 2,164,362 | Taylor | July 4, 1939 |